(12) United States Patent
Jokela et al.

(10) Patent No.: US 8,248,910 B2
(45) Date of Patent: Aug. 21, 2012

(54) PHYSICAL LAYER AND DATA LINK LAYER SIGNALLING IN DIGITAL VIDEO BROADCAST PREAMBLE SYMBOLS

(75) Inventors: Tero Jokela, Turku (FI); Jussi Vesma, Turku (FI); Harri J. Pekonen, Raisio (FI)

(73) Assignee: Nokia Corporation, Espoo (FI)

( * ) Notice: Subject to any disclaimer, the term of this patent is extended or adjusted under 35 U.S.C. 154(b) by 366 days.

(21) Appl. No.: 12/021,864

(22) Filed: Jan. 29, 2008

(65) Prior Publication Data
US 2009/0190677 A1 Jul. 30, 2009

(51) Int. Cl.
*H04J 11/00* (2006.01)
*H04J 1/00* (2006.01)
*H04J 3/24* (2006.01)
*H04B 7/208* (2006.01)
*H04J 3/12* (2006.01)

(52) U.S. Cl. ........ 370/208; 370/343; 370/349; 370/344; 370/524

(58) Field of Classification Search .......... 370/342, 370/347, 208, 335, 520, 207, 206, 203, 210, 370/344, 480, 503, 320
See application file for complete search history.

(56) References Cited

U.S. PATENT DOCUMENTS

| | | | | |
|---|---|---|---|---|
| 6,888,790 B2 * | 5/2005 | Kilani | ........................... | 370/208 |
| 2002/0154620 A1 * | 10/2002 | Azenkot et al. | .............. | 370/347 |
| 2006/0227892 A1 * | 10/2006 | Ouyang et al. | ................ | 375/267 |
| 2007/0220406 A1 | 9/2007 | Gubbi et al. | | |
| 2008/0144752 A1 * | 6/2008 | Zhou et al. | .................... | 375/347 |

FOREIGN PATENT DOCUMENTS

| | | |
|---|---|---|
| WO | 2004015948 A1 | 2/2004 |
| WO | 2007039479 A1 | 4/2007 |

OTHER PUBLICATIONS

Digital Video Broadcasting (DVB); DVB-H Implementation Guidelines (ETSI TR 102 377), V1.2.1 (Nov. 2005) Technical Report, European Telecommunications Standards Institute, 2005.

(Continued)

*Primary Examiner* — Nittaya Juntima
*Assistant Examiner* — Samina Choudhry
(74) *Attorney, Agent, or Firm* — Banner & Witcoff Ltd.

(57) ABSTRACT

Aspects of the invention are directed to physical layer and data link layer signaling in digital video broadcast preamble symbols. Embodiments are directed to distributing physical layer pre-signalling data among preamble symbols. If physical layer data is larger than a predetermined number of preamble symbols, then excess physical layer data is written to data symbols immediately following the preamble symbols in top-down order symbol by symbol or the predetermined number of preamble symbols is increased. If physical layer data is not larger than the predetermined number of preamble symbols such that there is excess preamble symbol space, physical layer pipe 0 data comprising link layer signaling and notification data is carried in the excess preamble symbols or the excess preamble symbols are left empty. Different permutation rules may be used to frequency interleave odd-numbered versus even-numbered orthogonal frequency division multiplexing symbols.

22 Claims, 15 Drawing Sheets

OTHER PUBLICATIONS

Digital Video Broadcasting (DVB); Framing structure, channel coding and modulation for digital terrestrial television (ETSI EN 300 744), V1.5.1 (Nov. 2004), European Standard (Telecommunications series), European Telecommunications Standards Institute, 2004.

ETSI TR 102 377 V1.2.1 (Nov. 2005) Digital Broadcasting (DVB); DVB-H Implementation Guidelines: Section 6 Physical layer elements, Section 7 DVB-H/DVB-T compatibility issues, Section 8 DVB-H services (8.1 Service Scenarios), pp. 34-42.

Faria, G. et al. "DVB-H: Digital broadcast services to handheld devices", Proceedings of the IEEE, vol. 94 No. 1, pp. 194-209, Jan. 2006.

International Search Report from International Application No. PCT/FI2009/000009, dated May 18, 2009, 13 pages.

China Patent Application No. 200980103417.8 First Office Action dated Aug. 25, 2011.

* cited by examiner

PHYSICAL LAYER AND DATA LINK LAYER SIGNALLING IN DIGITAL VIDEO BROADCAST PREAMBLE SYMBOLS

FIELD

Embodiments relate generally to communications networks. More specifically, embodiments relate to physical layer and data link layer signalling in digital video broadcast preamble symbols.

BACKGROUND

Digital broadband broadcast networks enable end users to receive digital content including video, audio, data, and so forth. Using a mobile terminal, a user may receive digital content over a wireless digital broadcast network. Digital content can be transmitted in a cell within a network. A cell may represent a geographical area that may be covered by a transmitter in a communication network. A network may have multiple cells, and cells may be adjacent to other cells.

A receiver device, such as a mobile terminal, may receive a program or service in a data or transport stream. The transport stream carries individual elements of the program or service such as the audio, video, and data components of a program or service. Typically, the receiver device locates the different components of a particular program or service in a data stream through Program Specific Information (PSI) or Service Information (SI) embedded in the data stream. However, PSI or SI signalling may be insufficient in some wireless communications systems, such as Digital Video Broadcasting-Handheld (DVB-H) systems. Use of PSI or SI signalling in such systems may result in a sub-optimal end user experience as the PSI and SI tables carrying in PSI and SI information may have long repetition periods. In addition, PSI or SI signalling requires a relatively large amount of bandwidth which is costly and also decreases efficiency of the system.

The data transmission in certain digital video broadcast systems, e.g., Digital Video Broadcast-Terrestrial Second Generation (DVB-T2) is defined to be Time Division Multiplex (TDM) and possibly in addition frequency hopping (Time Frequency Slicing). Thus, Time-Frequency slots are assigned to each service. Further, different levels of robustness (i.e. coding and modulation) may be provided for the services.

Considering the foregoing and other signalling factors, a relatively large amount of signalling information is involved. The signalling is transmitted in preamble symbols called P2 symbols following the P1 symbol.

Open System Interconnection (OSI) layer L1 (physical layer) signaling is divided into L1-pre (signalling) and L1 signalling, where L1-pre is of static size while the size of L1 varies as the amount of Physical Layer Pipes (PLPs) varies. L1-pre signalling acts as a key to the L1 signalling by signalling its transmission parameters, i.e., size, code rate, modulation, and the like. To enable the receiver to start receiving services, reception of L1-pre should be possible without other preliminary information than what is obtained from the reception of pilot or preamble symbol P1 (including FFT-size, guard interval (GI), Frame type). Therefore, the mapping of L1-pre should be defined uniquely for different system configurations. Further, the signalling should be robust against interference. To obtain robustness against impulse interference, such as, for example, from mobile phones, like GSM bursts, the signalling data should be distributed over several P2 symbols to achieve time interleaving with FFT sizes smaller than 16K (there are 8, 4, and 2 P2 symbols for 2k, 4k, 8k modes, respectively). Also, mapping of L1 and L2 signalling should be defined so that, based on the information obtained from L1-pre, L1 can be obtained and based on L1, the dedicated Physical Layer Pipe (PLP0) carrying (OSI) layer L2 (data link layer) signalling can be obtained.

As such, improved techniques for transmission and reception of L1 and L2 signalling in digital video broadcast system preamble symbols would advance the art.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

Aspects of the invention are directed to physical layer and data link layer signaling in digital video broadcast preamble symbols. Embodiments are directed to distributing physical layer pre-signalling data among preamble symbols. If physical layer data is larger than a predetermined number of preamble symbols, then excess physical layer data is written to data symbols immediately following the preamble symbols in top-down order symbol by symbol or the predetermined number of preamble symbols is increased. If physical layer data is not larger than the predetermined number of preamble symbols such that there is excess preamble symbol space, physical layer pipe 0 data is carried in the excess preamble symbols or the excess preamble symbols are left empty. Different permutation rules may be used to frequency interleave odd-numbered versus even-numbered orthogonal frequency division multiplexing symbols.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

Figure 1:
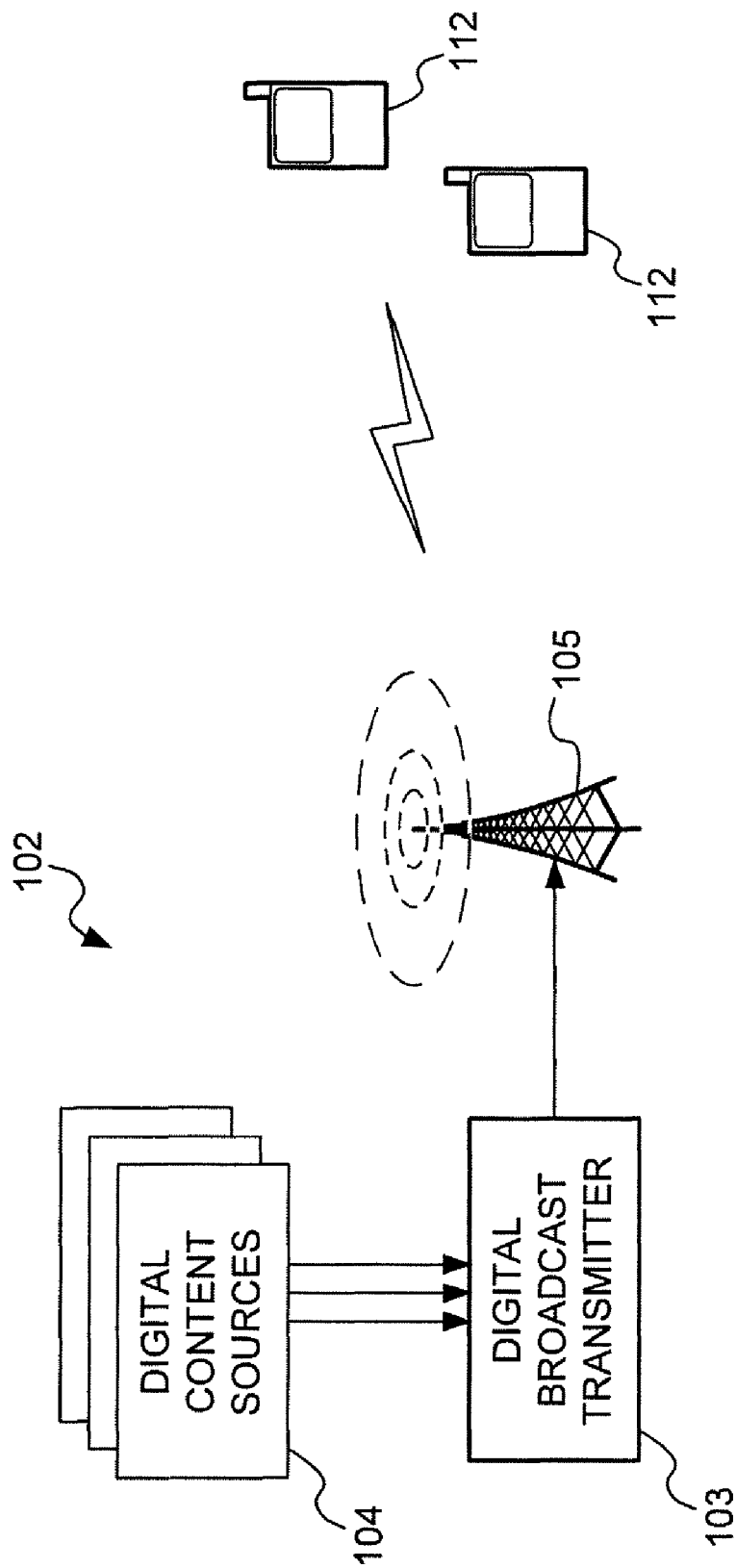
FIG. 1 illustrates a suitable digital broadband broadcast system in which one or more illustrative embodiments of the invention may be implemented.

FIG. 1 illustrates a suitable digital broadband broadcast system 102 in which one or more illustrative embodiments may be implemented. Systems such as the one illustrated here may utilize a digital broadband broadcast technology, for example Digital Video Broadcast-Handheld (DVB-H) or next generation Digital Video Broadcasting-Terrestrial (DVB-T2) or Digital Video Broadcasting-Handheld (DVB-H2) networks. Examples of other digital broadcast standards which digital broadband broadcast system 102 may utilize include Digital Video Broadcast-Terrestrial (DVB-T), Integrated Services Digital Broadcasting-Terrestrial (ISDB-T), Advanced Television Systems Committee (ATSC) Data Broadcast Standard, Digital Multimedia Broadcast-Terrestrial (DMB-T), Terrestrial Digital Multimedia Broadcasting (T-DMB), Satellite Digital Multimedia Broadcasting (S-DMB), Forward Link Only (FLO), Digital Audio Broadcasting (DAB), and Digital Radio Mondiale (DRM). Other digital broadcasting standards and techniques, now known or later developed, may also be used. Aspects of the invention may also be applicable to other multicarrier digital broadcast systems such as, for example, T-DAB, T/S-DMB, ISDB-T, and ATSC, proprietary systems such as Qualcomm MediaFLO/FLO, and non-traditional systems such 3GPP MBMS (Multimedia Broadcast/Multicast Services) and 3GPP2 BCMCS (Broadcast/Multicast Service).

Digital content may be created and/or provided by digital content sources 104 and may include video signals, audio signals, data, and so forth. Digital content sources 104 may provide content to digital broadcast transmitter 103 in the form of digital packets, e.g., Internet Protocol (IP) packets. A group of related IP packets sharing a certain unique IP address or other source identifier is sometimes described as an IP stream. Digital broadcast transmitter 103 may receive, process, and forward for transmission multiple digital content data streams from multiple digital content sources 104. In various embodiments, the digital content data streams may be IP streams. The processed digital content may then be passed to digital broadcast tower 105 (or other physical transmission component) for wireless transmission. Ultimately, mobile terminals or devices 112 may selectively receive and consume digital content originating from digital content sources 104.

Figure 2:
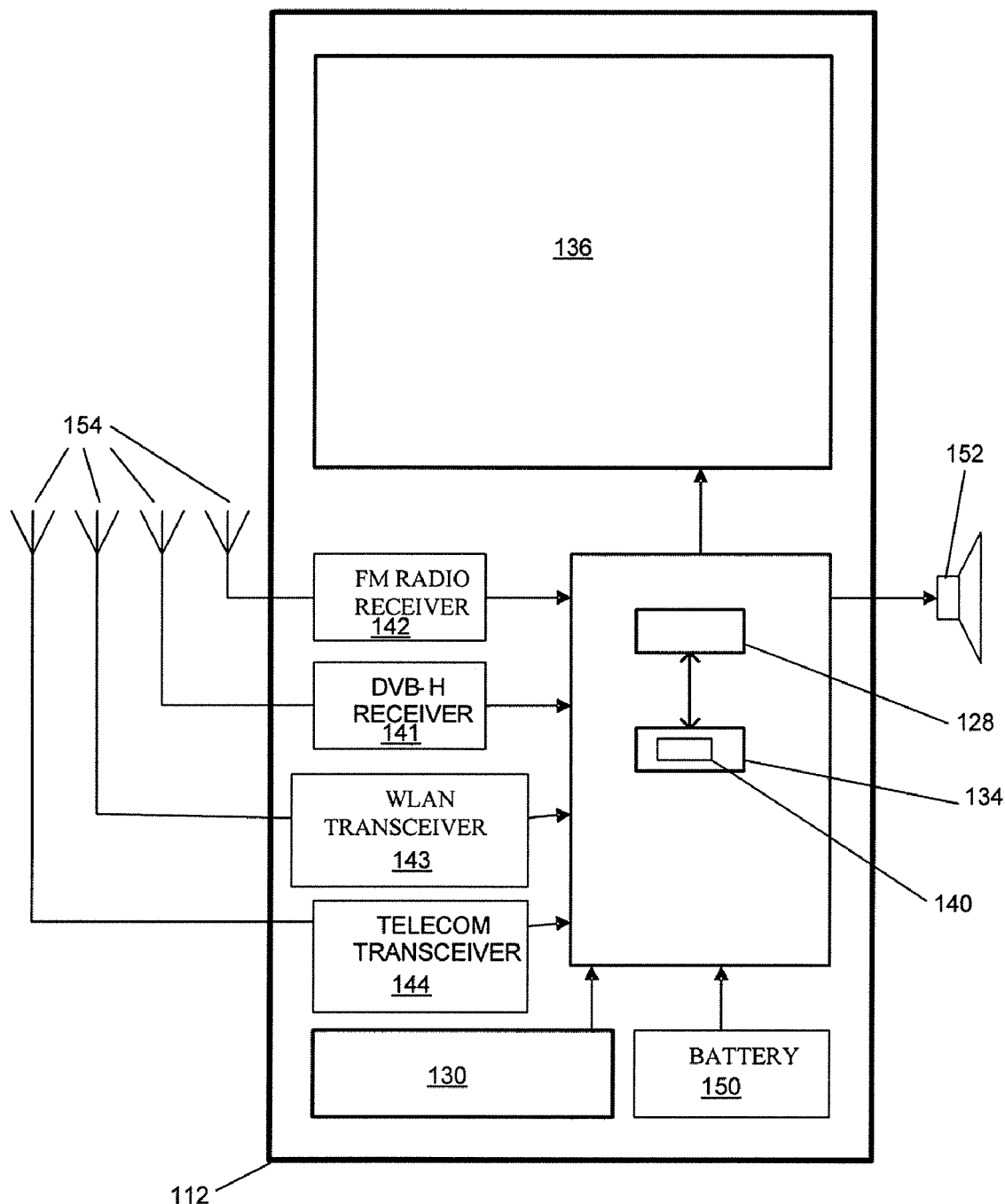
FIG. 2 illustrates an example of a mobile device in accordance with an aspect of the present invention.

As shown in FIG. 2, mobile device 112 may include processor 128 connected to user interface 130, memory 134 and/or other storage, and display 136, which may be used for displaying video content, service guide information, and the like to a mobile-device user. Mobile device 112 may also include battery 150, speaker 152 and antennas 154. User interface 130 may further include a keypad, touch screen, voice interface, one or more arrow keys, joy-stick, data glove, mouse, roller ball, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as handheld DVB-H/H2 or terrestrial DVB-T/T2, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. Mentioned receivers may be separate receiver chipsets or combination of the previous or receiver functionality may be integrated together with some other functionality within receiver device 112. The receiver device may also be a software defined radio (SDR). In one aspect of the invention, mobile device 112 may receive radio data stream (RDS) messages.

In an example of the DVB standard, one DVB 10 Mbit/s transmission may have 200, 50 kbit/s audio program channels or 50, 200 kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), or DVB-Terrestrial (DVB-T). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing entails sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

In addition, an electronic service guide may be used to provide program or service related information. Generally, an Electronic Service Guide (ESG) enables a terminal to communicate what services are available to end users and how the services may be accessed. The ESG includes independently existing pieces of ESG fragments. Traditionally, ESG fragments include XML and/or binary documents, but more recently they have encompassed a vast array of items, such as for example, a SDP (Session Description Protocol) description, textual file, or an image. The ESG fragments describe one or several aspects of currently available (or future) service or broadcast program. Such aspects may include for example: free text description, schedule, geographical availability, price, purchase method, genre, and supplementary information such as preview images or clips. Audio, video and other types of data including the ESG fragments may be transmitted through a variety of types of networks according to many different protocols. For example, data can be transmitted through a collection of networks usually referred to as the "Internet" using protocols of the Internet protocol suite, such as Internet Protocol (IP) and User Datagram Protocol (UDP). Data is often transmitted through the Internet addressed to a single user. It can, however, be addressed to a group of users, commonly known as multicasting. In the case in which the data is addressed to all users it is called broadcasting.

One way of broadcasting data is to use an IP datacasting (IPDC) network. IPDC is a combination of digital broadcast and Internet Protocol (IP). Through such an IP-based broadcasting network, one or more service providers can supply different types of IP services including on-line newspapers, radio, and television. These IP services are organized into one or more media streams in the form of audio, video and/or other types of data. To determine when and where these streams occur, users refer to an electronic service guide (ESG). One type of DVB is Digital Video Broadcasting-handheld (DVB-H). The DVB-H is designed to deliver 10 Mbps of data to a battery-powered terminal device.

DVB transport streams deliver compressed audio and video and data to a user via third party delivery networks. Moving Picture Expert Group (MPEG) is a technology by which encoded video, audio, and data within a single program is multiplexed, with other programs, into a transport stream (TS). The TS is a packetized data stream, with fixed length packets, including a header. The individual elements of a program, audio and video, are each carried within packets having an unique packet identification (PID). To enable a receiver device to locate the different elements of a particular program within the TS, Program Specific Information (PSI), which is embedded into the TS, is supplied. In addition, additional Service Information (SI), a set of tables adhering to the MPEG private section syntax, is incorporated into the TS. This enables a receiver device to correctly process the data contained within the TS.

As stated above, the ESG fragments may be transported by IPDC over a network, such as for example, DVB-H to destination devices. The DVB-H may include, for example, separate audio, video and data streams. The destination device must then again determine the ordering of the ESG fragments and assemble them into useful information.

Figure 3:
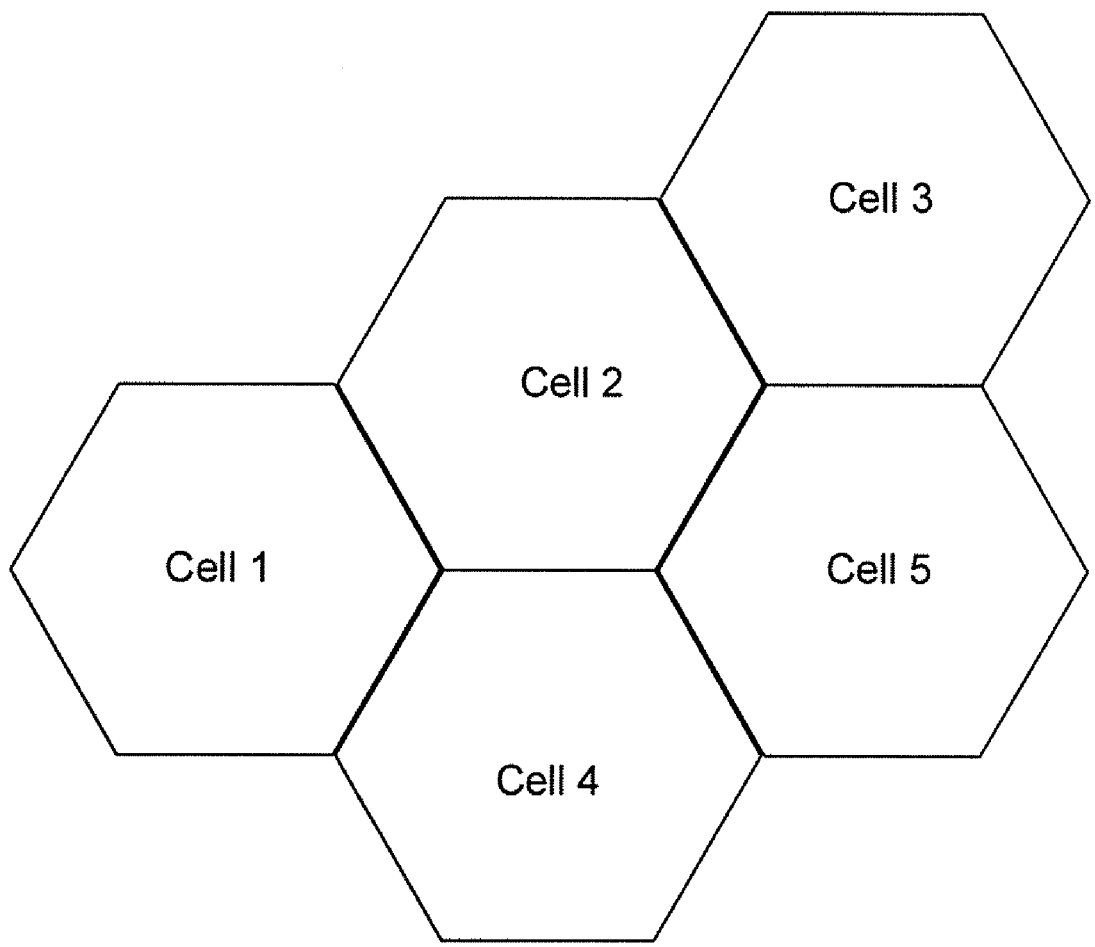
FIG. 3 illustrates an example of cells schematically, each of which may be covered by a different transmitter in accordance with an aspect of the present invention.

In a typical communication system, a cell may define a geographical area that may be covered by a transmitter. The cell may be of any size and may have neighboring cells. FIG. 3 illustrates schematically an example of cells, each of which may be covered by one or more transmitter each transmitting in the same frequency. In this example, Cell 1 represents a geographical area that is covered by one or more transmitter transmitting on a certain frequency. Cell 2 is next to Cell 1 and represents a second geographical area that may be covered by a different frequency. Cell 2 may, for example, be a different cell within the same network as Cell 1. Alternatively, Cell 2 may be in a network different from that of Cell 1. Cells 1, 3, 4, and 5 are neighboring cells of Cell 2, in this example.

Certain embodiments are directed to transmission of Open System Interconnection (OSI) layers L1 (Physical layer) and L2 (Data Link Layer) signalling in Digital Video Broadcasting-Terrestrial Second Generation (DVB-T2) system preamble symbols.

Such embodiments enable the transmission of L1 and L2 signalling and thus make it possible for the receiver to discover and receive services. L1 signalling provides information on the physical layer of the system, and L2 provides information on the mapping of services to the physical layer.

Figure 4:
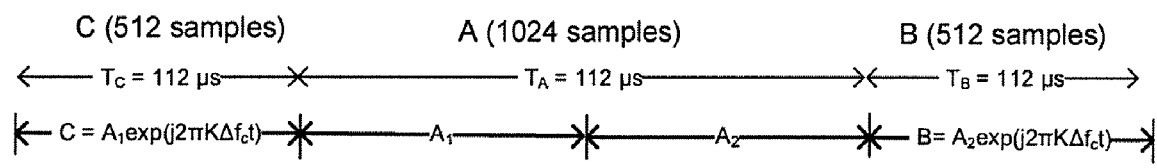
FIG. 4 shows an example P1 structure in accordance with certain embodiments.

FIG. 4 shows an example P1 structure in accordance with certain embodiments. The P1 symbol shown in FIG. 4 consists of a 1k Orthogonal Frequency Division Multiplexing (OFDM) symbol (part A), which is Differential Binary Phase Shift Keying (DBPSK) modulated in frequency direction by a set of binary sequences. In addition to the main symbol part A, the P1 symbol includes two frequency shifted cyclic extensions. Part C is a frequency shifted version of the first half of A (A1), and B is similarly a frequency shifted version of the latter half of A (A2). Parts C and B thus contain together the same information as part A. The frequency shift is K subcarriers for both C and B.

The Pseudo Random Binary Sequence (PRBS) is called the modulation signaling sequence (MSS), and it carries signaling information. In one embodiment, the P1 may signal: FFT size (3 bits), guard interval (GI) (2 bits), current type of FEF (Future Extension Frame) (2 bits), type(s) of other FEF frames (2 bits), use of Multiple Input Single Output (MISO) system (1 bit), use of Peak-to-Average Power Ratio (PAPR) pilots (1 bit), P2 type (3 bits) which tells the type of the following P2 symbol. These types may include P2 symbols for the second generation DVB-T2, next generation handheld (NGH), Multiple Input Multiple Output (MIMO), or Multiple Input Single Output (MISO).

In one embodiment, the L1 signaling is divided into two sections, as shown in the following Table.

| L1 pre-signalling | L1 signalling |
|---|---|
| TYPE [8b] | // Static param |
| RESERVED [16b] | CELL_ID [16b] |
| L1_COD [3b] | NETWORK_ID [16b] |
| L1_MOD [4b] | TFS_GROUP_ID [16b] |
| L1_FEC_TYPE [1b] | NUM_RF [3b] |
| L1_SIZE [18b] | RF_IDX [3b] |
| NUM_SYMBOLS [5b] | for each RF { |
| BW_EXT [1b] |   FREQUENCY [32b] |
| CRC-32 [32b] | } |
| | PILOT_PATTERN [3b] |
| | FRAME_LENGTH [10b] |
| | // Configurable param |
| | NUM_PLP [8b] |
| | RF_SHIFT [8b] |
| | for each PLP { |
| |   PLP_ID [8b] |
| |   PLP_GROUP_ID [8b] |
| |   PLP_COD [3b] |
| |   PLP_MOD [4b] |
| |   PLP_FEC_TYPE [1b] |
| | } |
| | PLP0_COD [3b] |
| | PLP0_MOD [4b] |
| | PLP0_FEC_TYPE [1b] |
| | // Dynamic param |
| | FRAME_IDX [8b] |
| | NOTIFICATION [1b] |
| | L2_SIZE [18b] |
| | NOTIF_SIZE [18b] |
| | for each PLP { |
| |   PLP_NUM_BLOCKS [8b] |
| |   PLP_START [18b] |
| | } |
| | CRC-32 [32b] |

The parameters and their indicated values are shown as an exemplary embodiment. The number and values of the parameters may vary in different embodiments. The first section, called L1 pre-signaling, uses a predetermined code rate and modulation, e.g. ¼ code rate and Quadrature Phase Shift Keying (QPSK), of relatively high robustness.

It contains a minimal set of the L1 signaling parameters, including the code rate and modulation for the second section. The second section, called L1 signaling, contains most of the L1 signaling parameters. Its coding rate and modulation is configurable, being signaled in the first section.

The advantage of splitting the L1 signaling is for achieving higher transmission efficiency, since most of the L1 signaling data is transmitted in the second section using a configurable and more efficient code rate and modulation. The minimal L1 signaling data in the first section has a fixed worst-case code rate and modulation and can be decoded by the receiver right away, without any signaling except P1 information. Thus, the first L1 section (L1-pre) acts as a key to the second one.

PLP0 is a special kind of PLP, which is dedicated to carriage of L2 and Notification data. The L2 signaling data is assumed to be present within PLP0, while the presence of the Notification data may change from frame to frame.

The signaling information carried within a frame typically refers to the next frame or the frame after the next frame.

The following table contains L2 signalling parameters.

| L2 signalling |
| --- |
| // Network related |
| cell_id [16b] |
| network_id [16b] |
| frequency [32b] |
| // Service related (new) |
| service_id { |
|   plp_id [8b] |
|   frame loop { |
|     frame_idx [8b] |
|   } |
| } |

The L1 signaling parameters are designed in such a way that T2 specific amendments to the Program Specific Information/Service Information (PSI/SI) as specified in first generation DVB-T systems are minimal. As can be seen from the L2 signalling table above, the new L2 data is the description of how each service is mapped onto the Time Frequency Slicing (TFS) structure.

The main task of the L1 pre-signalling is to tell the receiver how to receive the rest of the L1 signaling. Various L1 pre-signalling fields will now be discussed.

TYPE: This composite field includes information describing for example: (1) the transmission system: DVB-T2, DVB-H2, or future extensions; (2) the diversity scheme: examples thereof are Multiple Input Multiple Output (MIMO), Multiple Input Single Output (MISO), and their type; and (3) the used protocols for the services: Transport Stream (TS), Generic Stream Encapsulation (GSE).

L1_COD: Code rate of the main L1 signaling data block.

L1_MOD: Modulation of the main L1 signaling data block.

L1_FEC_TYPE: FEC block size used for the main L1 signaling data block.

L1_SIZE: Size of the main L1 signaling data block, in OFDM cells.

NUM_SYMBOLS: The total number of symbols used for carrying the L1 pre-signaling and L1 signaling. This parameter is used by the receiver in order to buffer a sufficient number of symbols, prior to decoding and de-mapping the relevant parts.

BW_EXT: Bandwidth extension flag, to signal the use of extended bandwidth for 16K and 32K modes.

CRC-32: This field ensures that the L1 pre-signaling data is error free.

The L1 pre-signaling data block is received without the help of any other signaling, so the following should be pre-determined: (1) code rate and modulation, (2) block size, and (3) cell mapping onto the P2 preamble. As L1 pre-signaling contains only static parameters, which do not change during normal operation, receiver may in one embodiment receive and combine information from several frames and so improve robustness.

The L1 signaling, shown in the right column of the L1 Signalling table above, conveys information that enables the discovery and reception of PLPs. In one embodiment, it is further subdivided into three groups of parameters, according to their updating frequency: static, configurable, and dynamic.

Static parameters are fundamental network parameters, which do not change during normal operation. Several static parameters will now be discussed.

CELL_ID: This is a 16-bit field which uniquely identifies a cell.

NETWORK_ID: This is a 16-bit field which serves as a label to identify the delivery system, about which the Network Information Table (NIT) informs, from any other delivery system. Allocations of the value of this field are found in ETR 162 [ETSI Technical Report Digital broadcasting systems for television, sound and data services; Allocation of Service Information (SI) codes for Digital Video Broadcasting (DVB) systems].

TFS_GROUP_ID: This uniquely identifies a TFS group when multiple TFS groups coexist.

NUM_RF: Number of RF channels in the TFS group.

RF_IDX: Index of the current RF channel within its TFS structure, between 0 and NUM_RF−1.

FREQUENCY: Carrier frequency (channel center frequency including possible offset) for each RF channel in the TFS group. The order of frequencies is implicit from the loop order. The receiver can also discover these frequencies by itself during the initial scan, so under certain circumstances these parameters may not be needed.

PILOT_PATTERN: pilot pattern used for the data OFDM symbols.

FRAME_LENGTH: number of data OFDM symbols per frame.

Configurable parameters change rarely, e.g., when services are added or removed. Several configurable parameters will now be discussed.

NUM_PLP: Number of PLPs in the TFS multiplex.

RF_SHIFT: Incremental shift, in terms of OFDM symbols, between adjacent RF channels. Under certain circumstances, this parameter may change from frame to frame, in which case it belongs in the dynamic parameters category.

PLP_ID: ID of each PLP. Using IDs instead of indices enables a more flexible allocation of the PLPs within the TFS multiplex.

PLP_GROUP_ID: Specifies the PLP group, into which the PLP belongs.

PLP_COD: Code rate of each PLP.

PLP_MOD: Modulation of each PLP.

PLP_FEC_TYPE: FEC block size for each PLP (0=16200, 1=64800).

PLP0_COD: Code rate of PLP0 (signaling PLP).

PLP0_MOD: Code rate of PLP0 (signaling PLP).

PLP0_FEC_TYPE: FEC block size for PLP0 (0=16200, 1=64800).

Dynamic parameters change for each frame. Several dynamic parameters will now be discussed.

FRAME_IDX: Index of the current frame (0 . . . SUPER_FRAME_LENGTH).

NOTIFICATION: This field indicates if notification data is present in the current frame.

PLP_NUM_BLOCKS: Number of FEC blocks in the current frame, for each PLP.

PLP_START: Start address of each PLP. Actually, what is signaled is the start address of the first slot in RF0. As the incremental time offset (shift) between adjacent RF channels is assumed to be constant, the start addresses of the slots in the other RF channels can be computed by the receiver. Therefore, there is no need for signaling the start addresses of each RF channel.

L2_SIZE: Size of the L2 data in PLP0 for the current frame. It is used for separating L2 data from notification data in PLP0.

NOTIF_SIZE: Size of the notification in PLP0 for the current frame. It is used for separating notification data from L2 data in PLP0.

The sizes of the slots in the TFS structure do not need to be signaled explicitly. It is enough to signal the number of FEC blocks in each PLP, from which the number of OFDM cells per PLP can be computed knowing the constellation size. Once the number of OFDM cells per frame per PLP is known, the size of each slot can be computed assuming that slots have the same size, up to a single cell.

The L2 signaling includes PSI/SI signaling information that describes the mapping of the services within the transport stream and onto the TFS multiplex. The latter means that PSI/SI is amended to enable end-to-end mapping of the services onto the PLPs of the TFS frame. The TFS frame duration sets the minimum repetition interval of any PSI/SI table. L2 signaling data is carried within PLP0, together with the Notification data (when available).

Co-scheduled signaling means that the dynamic L1 signaling data specific to a PLP, i.e. slot allocation, is multiplexed with the payload data of that particular PLP. This allows the receiver following a particular service to get the dynamic L1 signaling information without having to receive P2 every frame.

The notification channel can be used for transmitting notifications and carousel data, which are available to the receiver regardless of which PLP is being received. The Notification data is carried within PLP0, together with the L2 signaling data.

Figure 5:
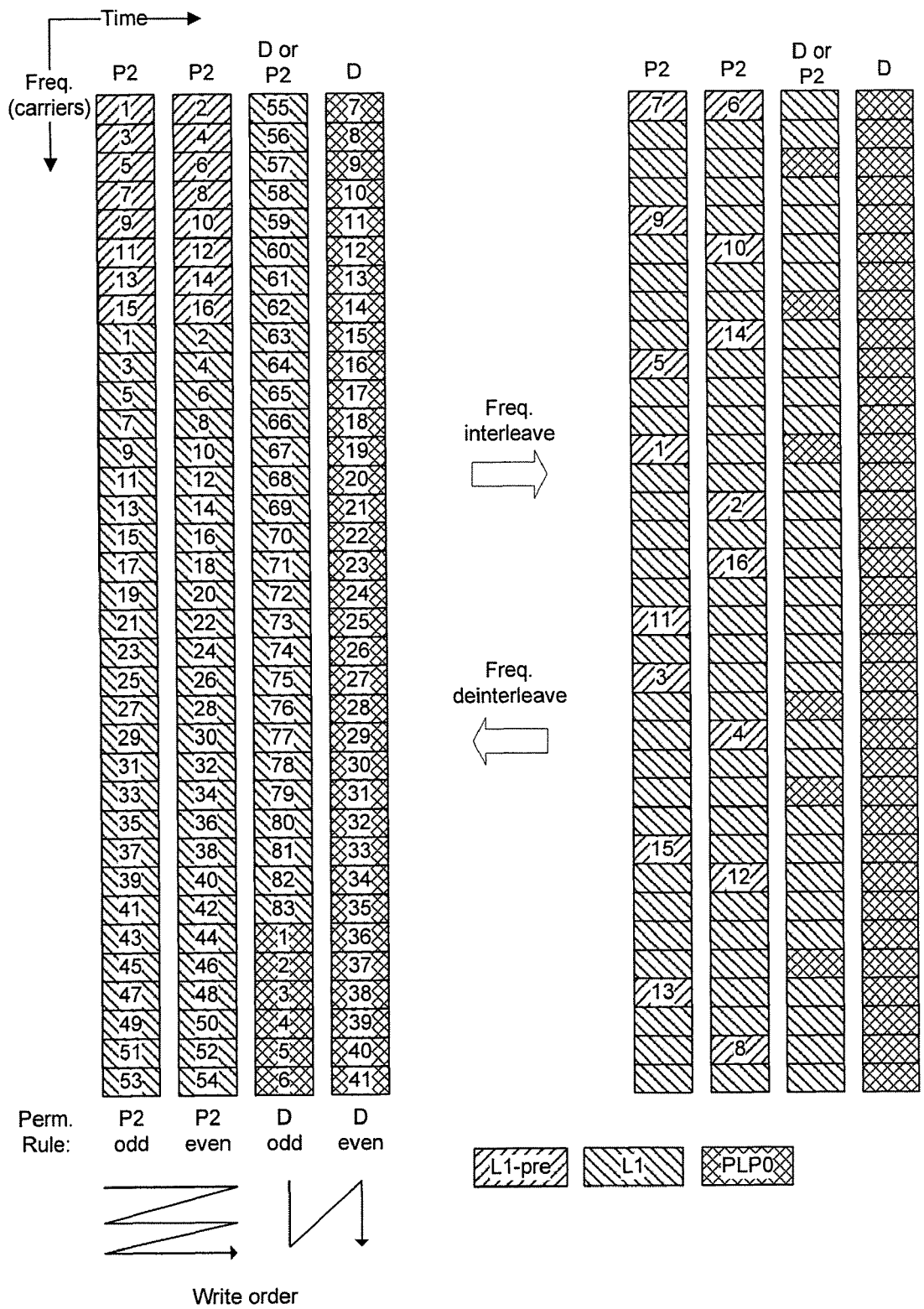
FIG. 5 shows an example of how L1 data fills the P2 symbols and flows over to data symbols in accordance with certain embodiments.

FIG. 5 shows an example of how L1 data fills the P2 symbols and flows over to data or additional P2 symbols in accordance with certain embodiments. FIG. 5 shows, as an example, 8k mode, in which two P2 symbols are used. First, L1-pre cells (data for each carrier) are distributed as evenly between P2 symbols as is reasonably possible to obtain resistance against impulse interference. This can be done by assigning L1-pre cells in a row-wise zig-zag manner into the P2 symbols, e.g., L1-pre cells 1-16 shown at the top of the two P2 columns to the left of FIG. 5.

Figure 6:
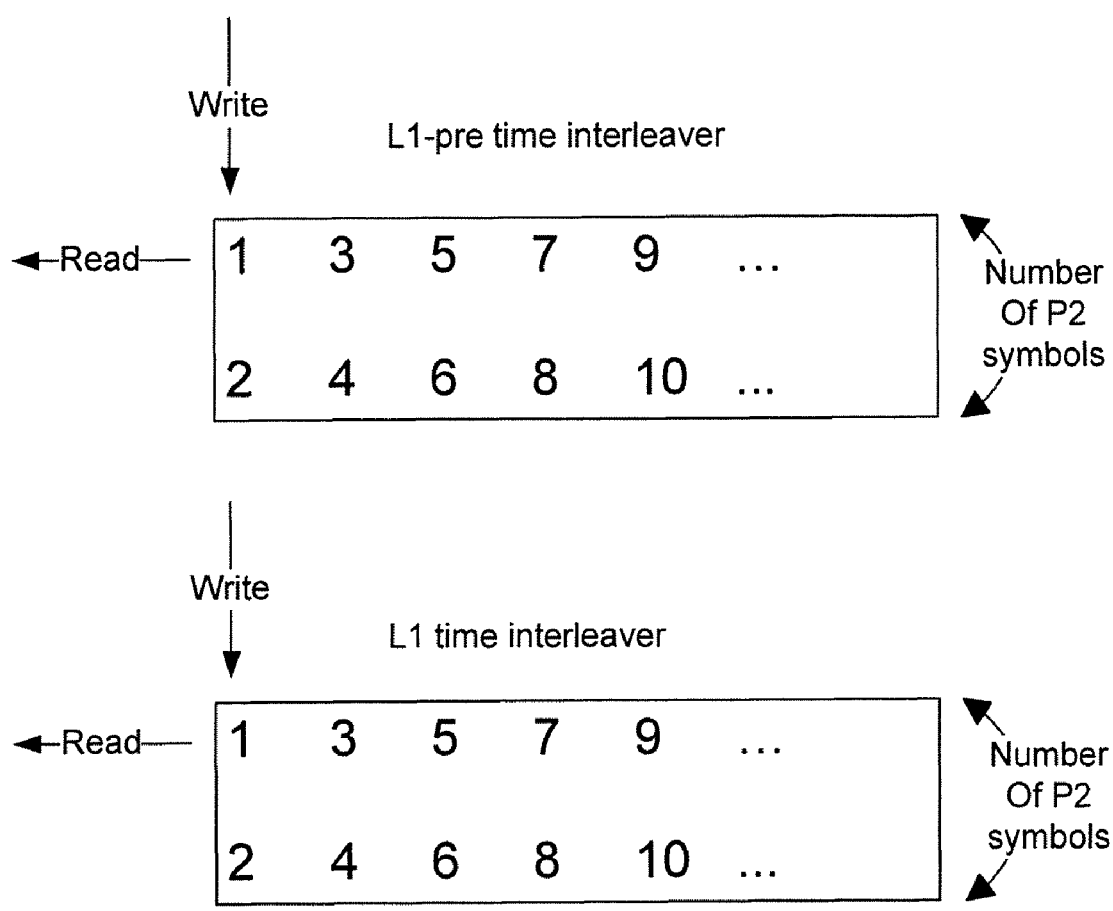
FIG. 6 shows a block interleaver in accordance with certain embodiments.

FIG. 6 shows a block interleaver in accordance with certain embodiments. The block interleaver of FIG. 6 may be used to implement the time interleaving shown in FIG. 5.

Following the 16 L1-pre cells, as many L1 cells as are available are written to P2 symbols in a similar way. If the L1 data does not fit in the P2 symbols, then the rest of the L1 information is written to the data symbol(s) immediately following the P2 symbols in "top-down" order (as normal data), symbol by symbol, or the number of P2 symbols is extended to enable signalling data reception directly from P2 symbols without the need to do channel estimation from following data symbols, as is shown by L1 cells 55-83 in FIG. 5. Different pilot patterns are used for P2 symbols versus data symbols.

Figure 7:
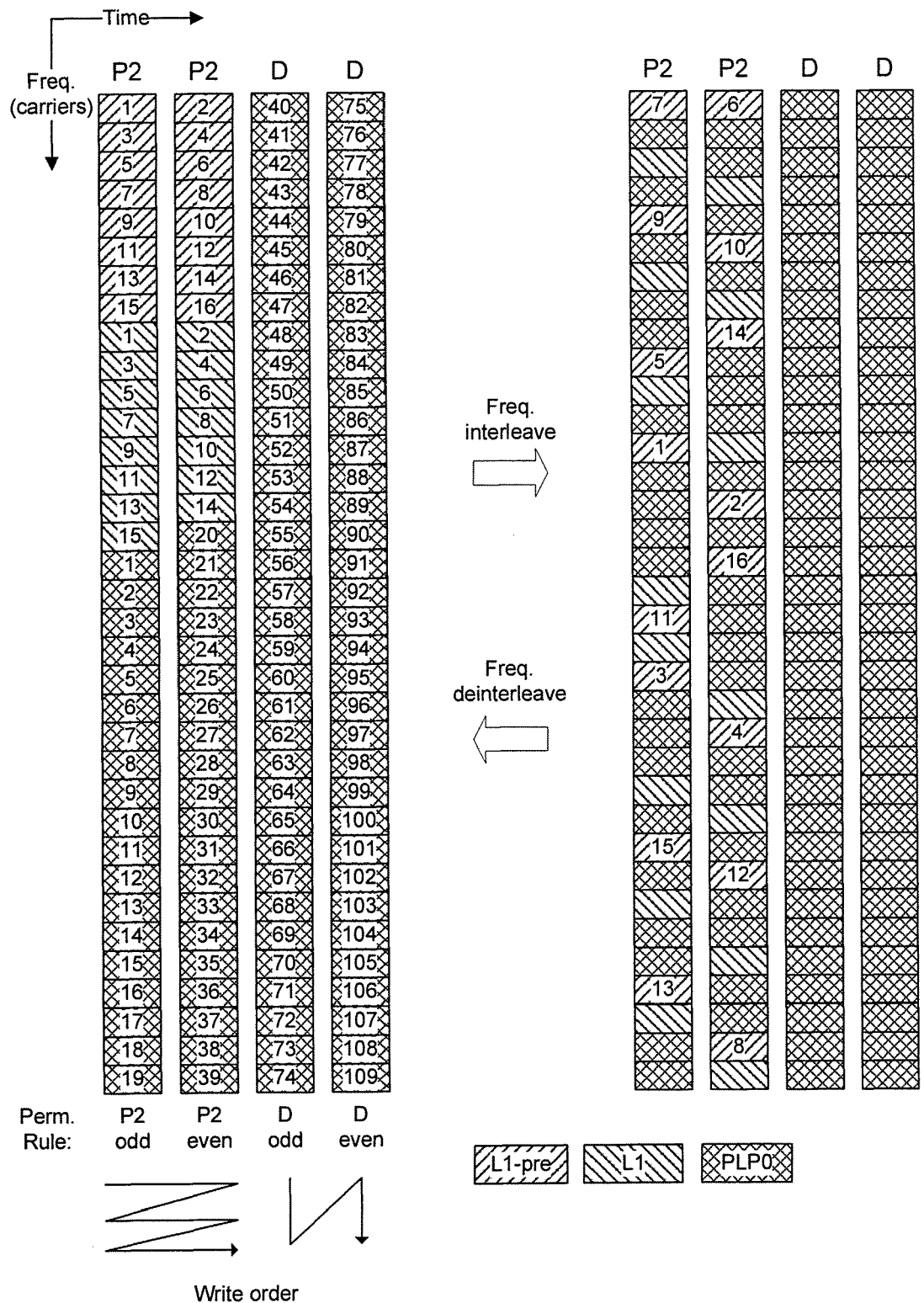
FIG. 7 is similar to FIG. 5, but in FIG. 5, L1 data does not fill the P2 symbols.

FIG. 7 is similar to FIG. 5, but in FIG. 5, L1 data does not fill the P2 symbols. If the L1 data fits inside P2 symbols and there is space left, PLP0 may be carried in the P2 symbols, as shown by PLP0 cells 1-39 in FIG. 7, or the cells may be left empty (padded). PLPs are mapped into the cells left after L1 in "top-down" order. In certain embodiments, zig-zag writing is done only for L1-pre and L1 signalling to obtain time diversity for the signalling.

Once the data is written to the symbols, frequency interleaving may be performed. There may be different permutation rules for at least odd versus even OFDM symbols so that it is unlikely that, e.g., L1-pre information would be carried on the same carrier in subsequent P2 symbols.

In the receiver, frequency deinterleaving is performed, and signalling data may be reconstructed by the receiver in the following order: P1, L1-pre, L1, and L2, as is discussed in more detail below.

Figure 8:
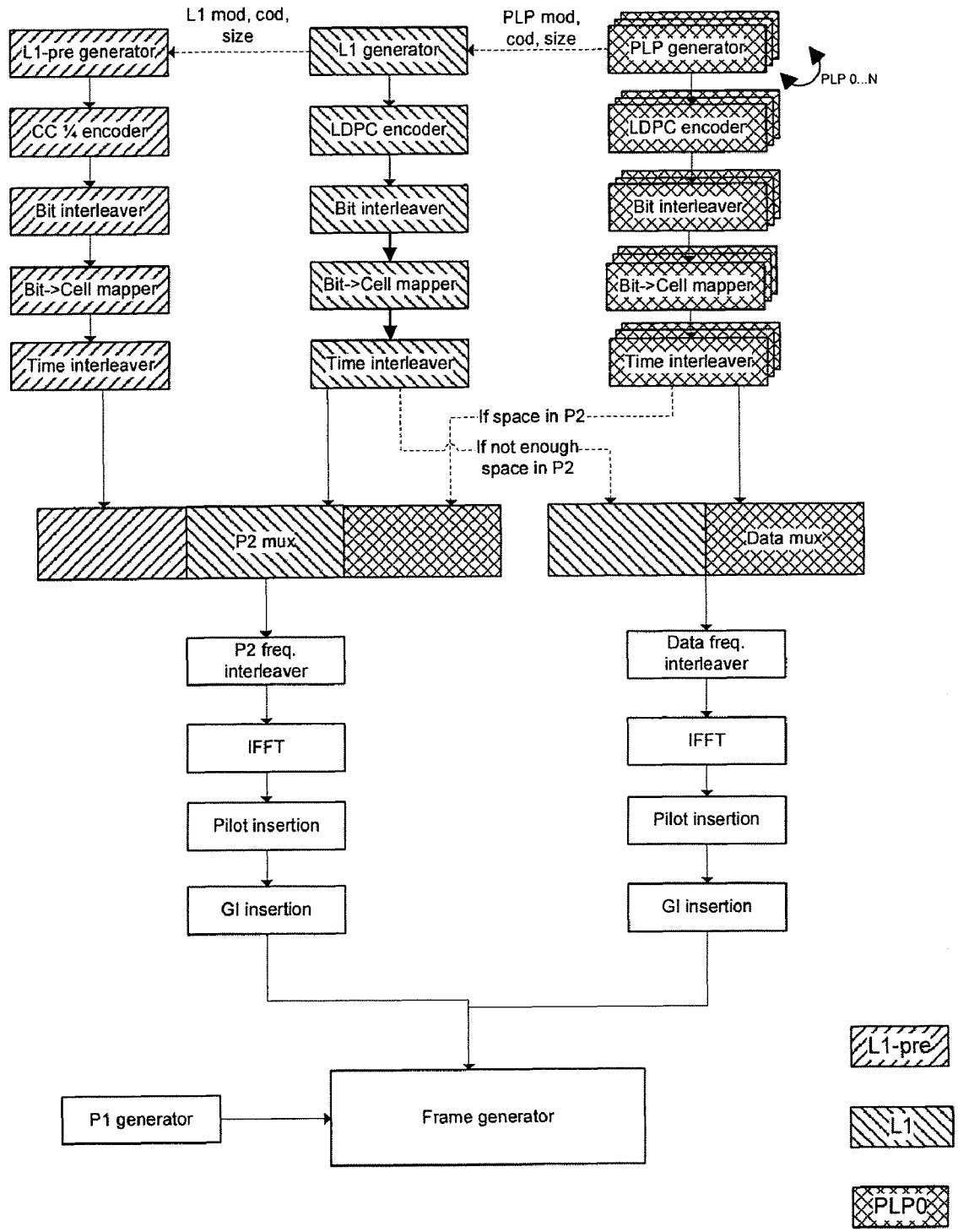
FIG. 8 is a schematic diagram of a transmitter in accordance with certain embodiments.

FIG. 8 is a schematic diagram of a transmitter in accordance with certain embodiments. First, PLPs are generated, encoded by Low Density Parity Check (LDPC) code, bit-interleaved, mapped to cells, and time interleaved. Then L1 information may be generated, coded, and the like, based on information on PLP code rates, modulation, scheduling, and the like.

L1 time interleaver may be a block interleaver of the type described in connection with FIG. 6. After the L1 information is generated, L1-pre information may be generated, coded, and the like, based on the code rate, modulation, and size of the L1 information. The L1-pre CC ¼ encoder depicts a convolutional code of rate ¼ encoding.

Then, P2 multiplexer assigns the L1-pre, L1, and PLP0 information to P2 and, if there is not enough space available in P2, to data symbols as described above, and as shown by the dashed arrows from the PLP0 time interleaver to the PLP0 section of the P2 multiplexer and from L1 time interleaver to the L1 section of the data multiplexer shown in FIG. 8.

The L1-pre and L1 time interleavers implement the zig-zag writing of the data to the P2 symbols, as shown in FIGS. 5 and 7. The number of rows in the interleaver may be defined by the number of P2 symbols, which depends on the FFT size.

P2 frequency interleaver interleaves the cells in P2 symbols in a symbol by symbol manner. For the interleaved P2 symbols, Inverse Fast Fourier Transform (IFFT) is performed, and pilots and guard interval are inserted.

For the PLPs, the data multiplexer may insert the cells in the data symbols in a continuous manner. Data frequency interleaver interleaves the cells. In accordance with certain embodiments, the data frequency interleaver should be different from the P2 frequency interleaver because the amount of pilots in P2 differs from the amount of pilots for data symbols. For the interleaved data symbols, IFFT is performed, and pilots and guard interval are inserted.

Figure 9:
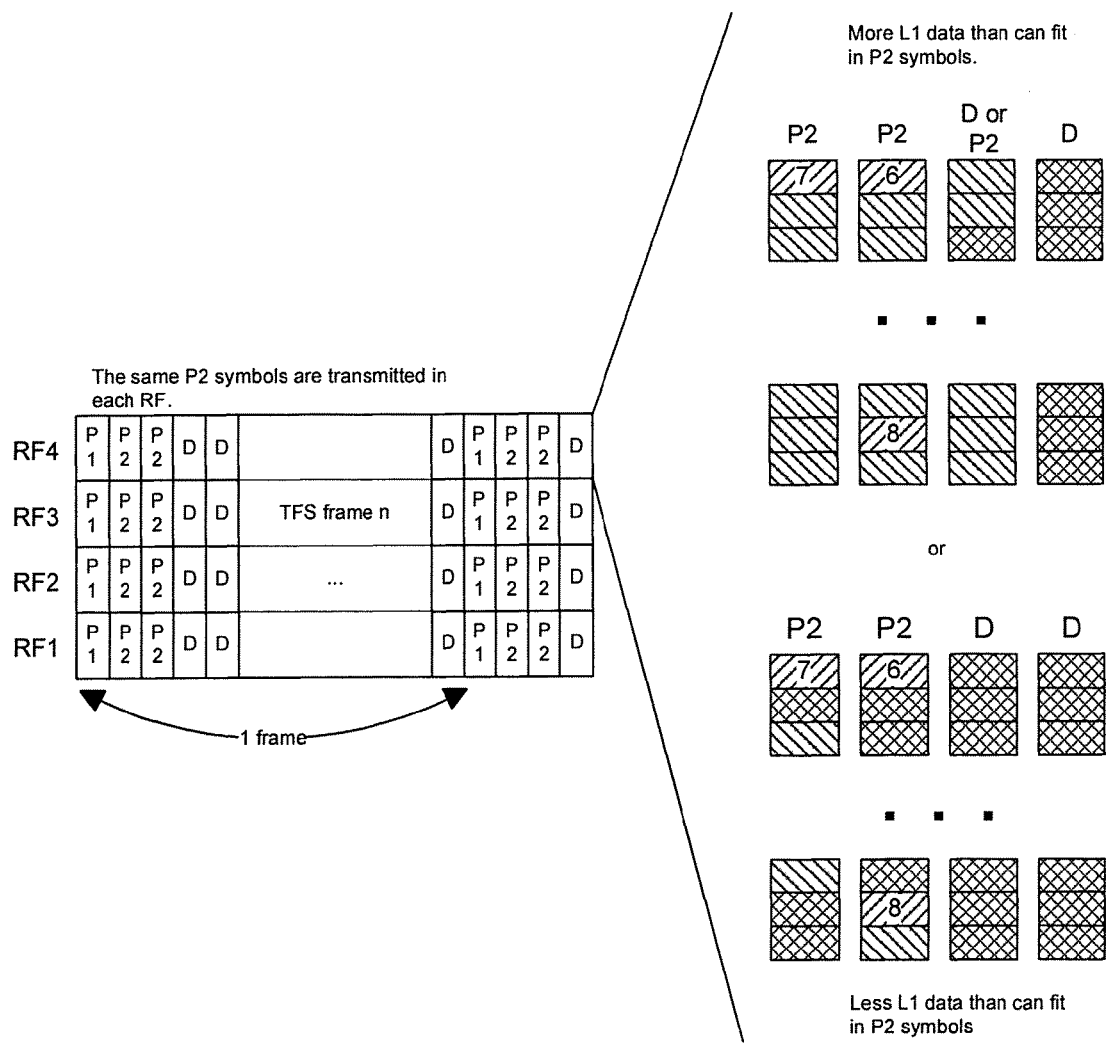
FIG. 9 shows an example of frames generated by the frame generator of FIG. 8.

FIG. 9 shows an example of frames generated by the frame generator of FIG. 8. The frame generator generates frames by inserting P1, P2, and data symbols. In certain embodiments, the same P2 symbols and PLP0 are transmitted in each radio frequency (e.g., RF1 through RF4, shown in FIG. 9). The data PLPs following PLP0 may be different in each RF.

Figure 10:
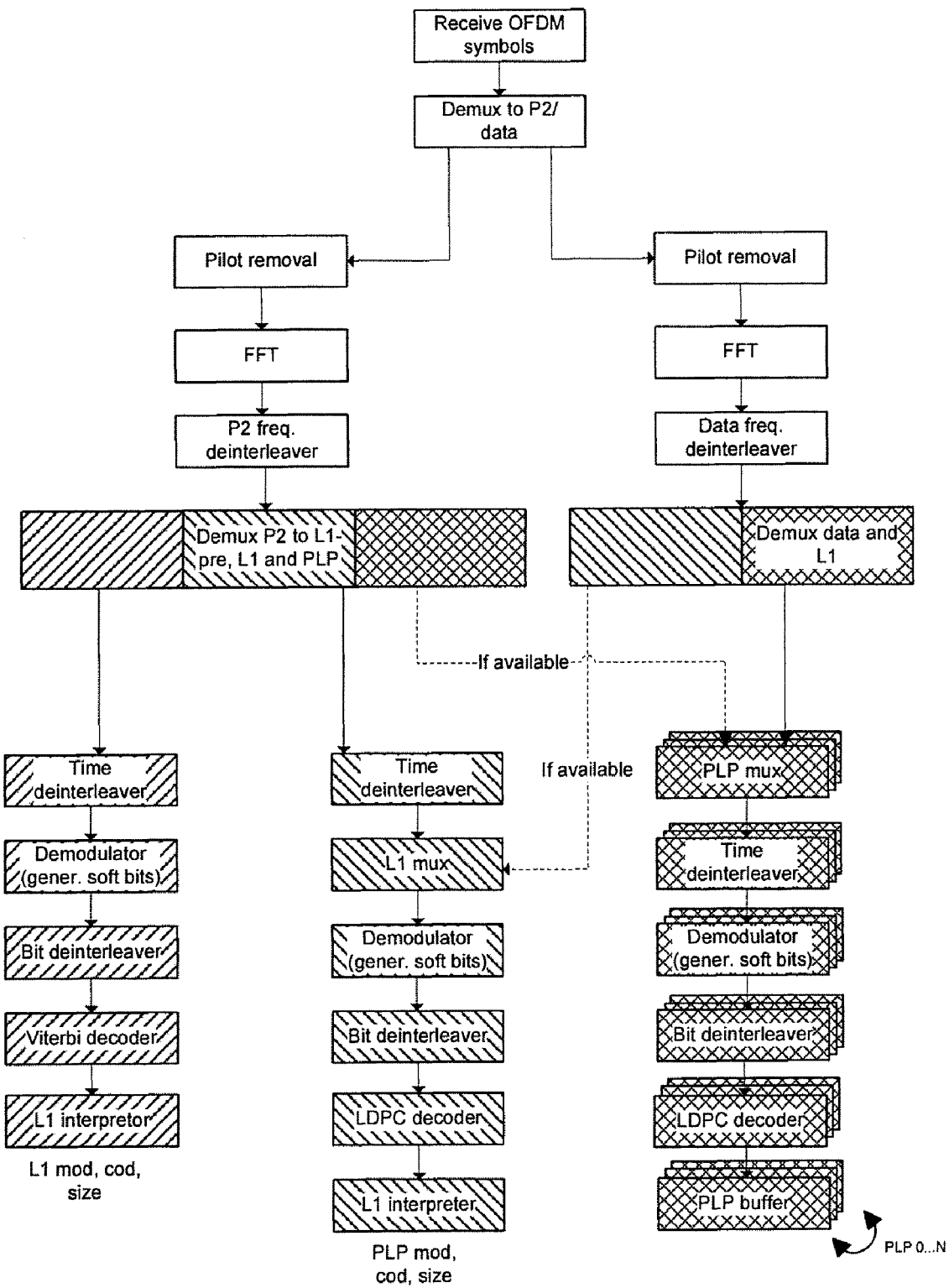
FIG. 10 is a schematic diagram of a receiver in accordance with certain embodiments.

FIG. 10 is a schematic diagram of a receiver in accordance with certain embodiments. Received OFDM symbols are demultiplexed to P2 symbols and data. Pilot removal, FFT, frequency deinterleaving are then performed separately on the P2 symbols and the data. Demultiplexing of P2 to L1-pre, L1, and, if there was room for PLP0 in P2) PLP0 is then performed separately from demultiplexing of data and, if there was insufficient space in P2 symbols for L1 data, L1.

L1-pre is then time deinterleaved, demodulated to generate soft bits, bit deinterleaved, Viterbi decoded and interpreted, thereby yielding L1 modulation, code rate, and size.

L1 is time deinterleaved, multiplexed (including any L1 that did not fit in the P2 symbols), demodulated to generate soft bits, bit deinterleaved, LDPC decoded and interpreted, thereby yielding PLP modulation, code rate, and size.

Data (including any data that fit in P2 symbols) is PLP multiplexed, time deinterleaved, demodulated to generate soft bits, bit deinterleaved, LDPC decoded, and buffered.

Figure 11:
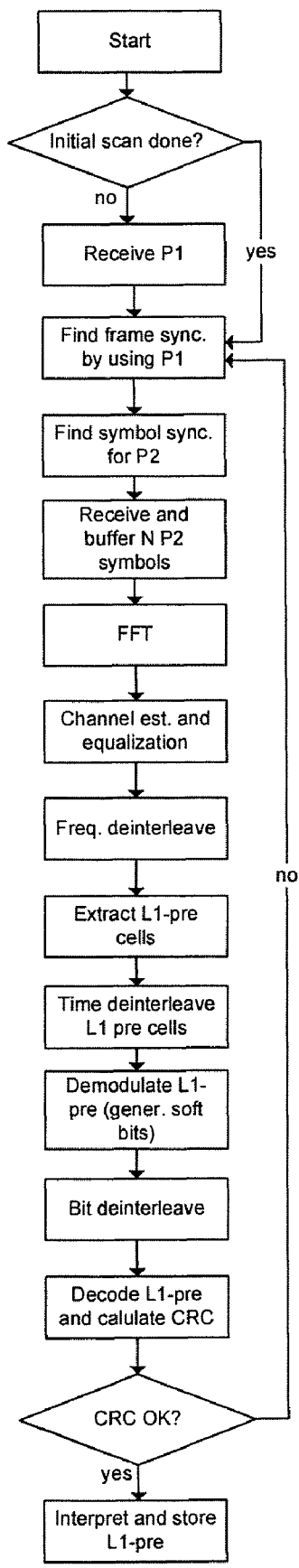
FIG. 11 is a flow diagram showing steps for receiving L1 pre-signalling information in accordance with certain embodiments.

As mentioned above, in the receiver, signalling data may be reconstructed by the receiver in the following order: P1, L1-pre, L1, and L2. FIG. 11 is a flow diagram showing steps for receiving L1 pre-signalling information in accordance with certain embodiments. If the initial scan is not done, P1 is received. P1 may include various known parameters, such as FFT, guard interval (GI), and frame type, e.g., T2/future. Otherwise, frame synchronization is found by using P1 and symbol synchronization is found for P2. "N" P2 symbols are then received and buffered. N can be determined from the FFT size as follows: if the FFT size is 2k, then N=8; for 4k, N=4; for 8k, N=2; and for 16k and 32k, N=1.

FFT, channel estimation and equalization, frequency deinterleaving, and extraction of L1 pre-signalling cells is performed. L1 pre-signalling cells are deinterleaved and written in an across and then down zig zag order. L1 pre-signalling may then be demodulated to generate soft bits, and bit deinterleaving is performed.

L1 pre-signalling is then decoded and a Cyclic Redundancy Check (CRC) may be calculated. If CRC failed in an earlier round, old soft bits and new soft bits may be combined to improve robustness. If the CRC check fails (i.e., it is not OK), processing returns to finding frame synchronization by using P1. Otherwise, if the CRC check passes (i.e., it is OK), then L1 pre-signalling information is interpreted and stored. Known parameters may include L1_COD, L1_MOD, L1_FEC_BLOCK, L1_SIZE, NUM_SYMBOLS=symbols that include L1 signalling; and BW_EXT. These L1 pre-signalling parameters are discussed in more detail above.

Figure 12:
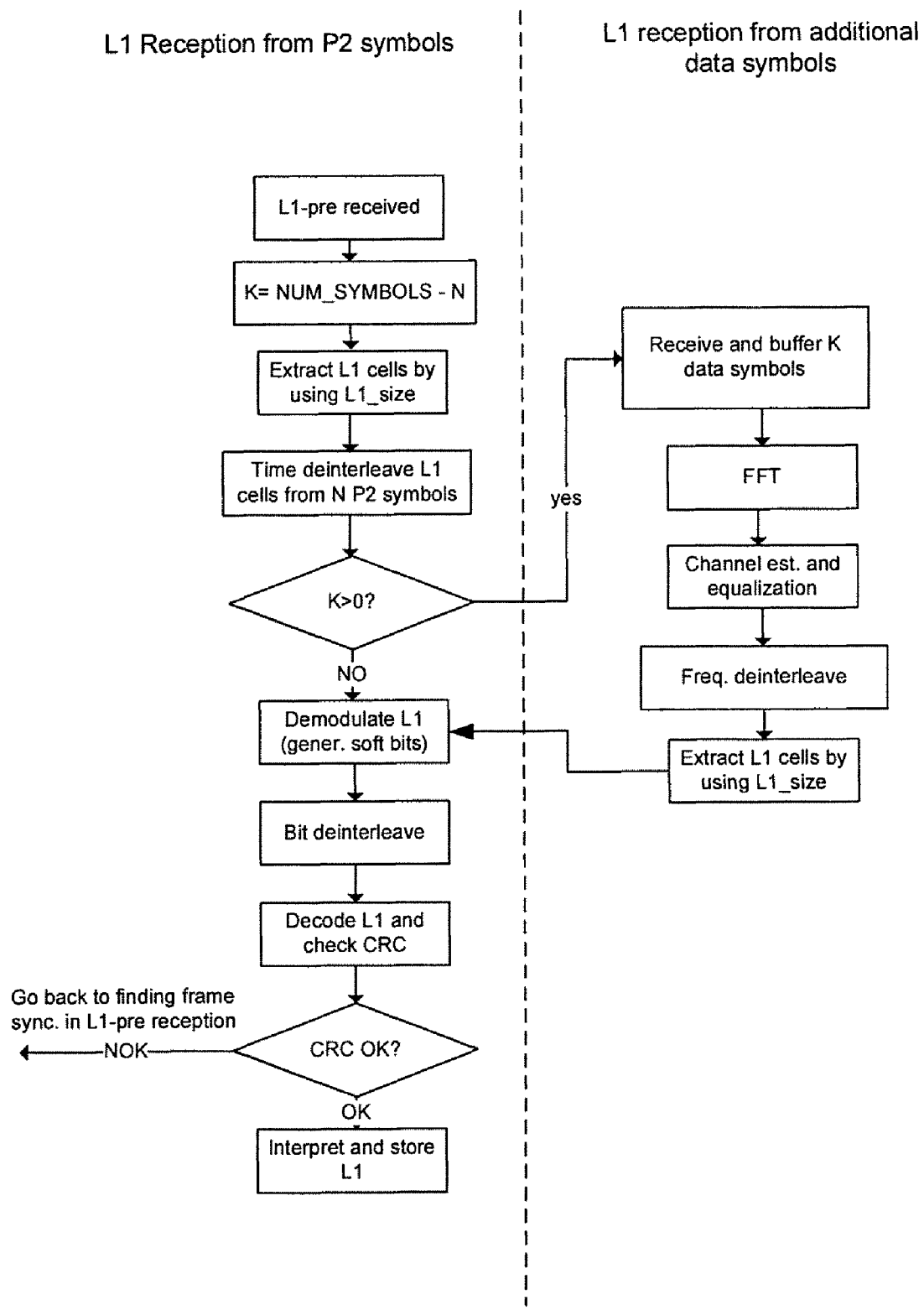
FIG. 12 is a flow diagram showing steps for receiving L1 from P2 symbols and from additional data symbols in accordance with certain embodiments.

FIG. 12 is a flow diagram showing steps for receiving L1 from P2 symbols and from additional data symbols in accordance with certain embodiments. If additional P2 symbols for L1 are used, the flow diagram may be slightly different. L1 pre-signalling is received and K is set to the number of symbols minus N. L1 cells are extracted by using L1_size. L1 cells are time deinterleaved from N P2 symbols. If K is greater than zero, then L1 reception from additional data symbols is performed as follows. K data symbols are received and buffered, FFT, channel estimation and equalization, and frequency deinterleaving are performed. L1 cells are extracted by using L1_size. Next, L1 cells are demodulated to generate soft bits. Bit deinterleaving is then performed. L1 is decoded and a CRC check is performed. If the CRC is OK, L1 is interpreted and stored. Otherwise, if CRC is not OK, then processing returns to finding frame synchronization in L1-pre signalling reception.

Figure 13:
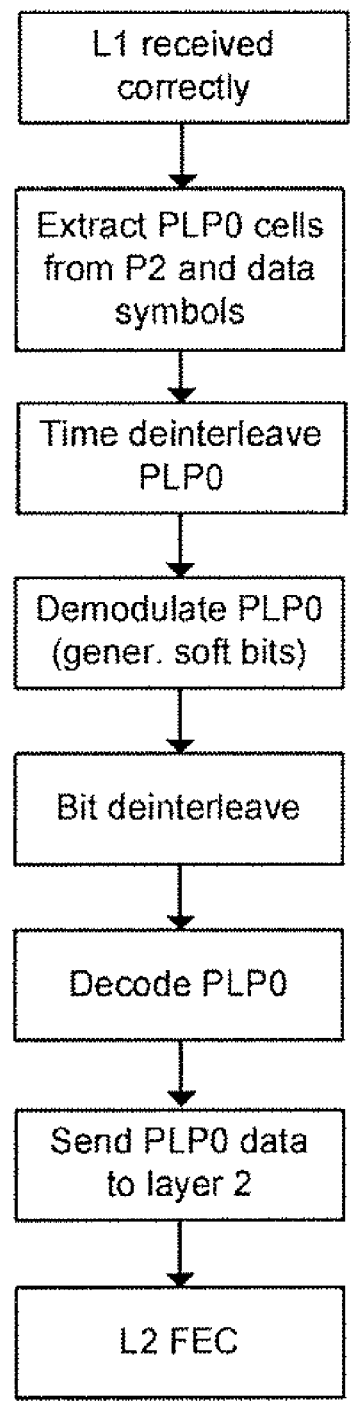
FIG. 13 is a flow diagram showing steps receiving L2 signalling in accordance with certain embodiments.

FIG. 13 is a flow diagram showing steps receiving L2 signalling in accordance with certain embodiments. After L1 has been received correctly, PLP0 cells are extracted from P2 (if any PLP0 cells are present in P2) and data symbols. PLP0 is demodulated to generate soft bits. Bit deinterleaving and PLP0 decoding are performed, and PLP0 data is sent to layer 2. Layer 2 Forward Error Correction (FEC) processing is then performed.

Figure 14:
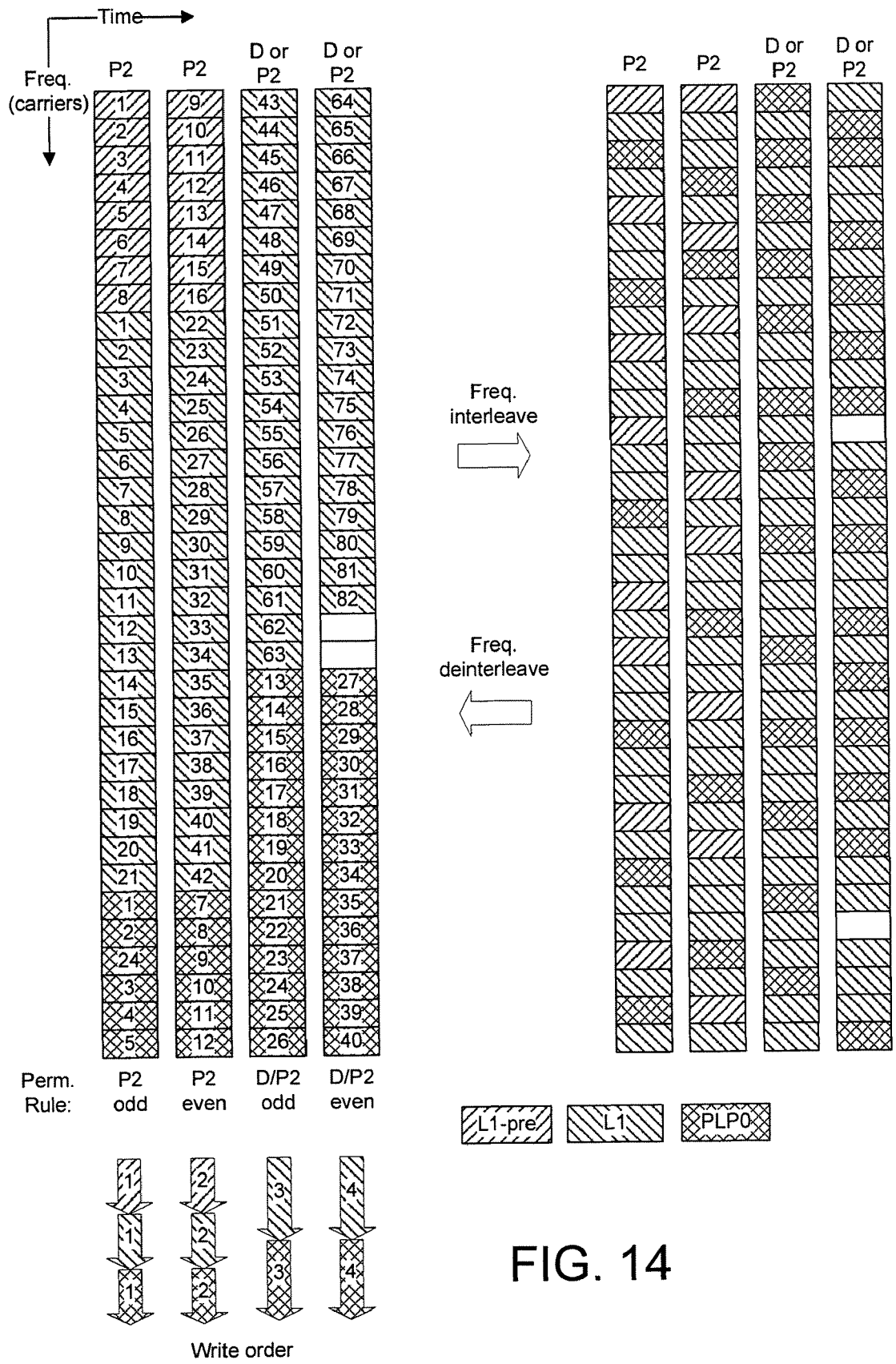
FIG. 14 shows an example of how L1 signalling fills the P2 symbols and flows over to data symbols in accordance with certain embodiments.

FIG. 14 shows an example of how L1 signalling fills the P2 symbols and flows over to data symbols in accordance with certain embodiments. FIG. 14 is similar to FIG. 5. But the write order in FIG. 14 is "top down" for L1 pre-signalling and L1 signalling. The number of rows of L1 pre-signalling cells may be calculated by dividing the size of the L1 pre-signalling information by the number of P2 symbols into which L1 pre-signalling information will be inserted. Similarly, the number of rows of L1 signalling cells may be calculated by dividing the size of the L1 signalling information by the number of P2 symbols into which L1 signalling information will be inserted.

Figure 15:
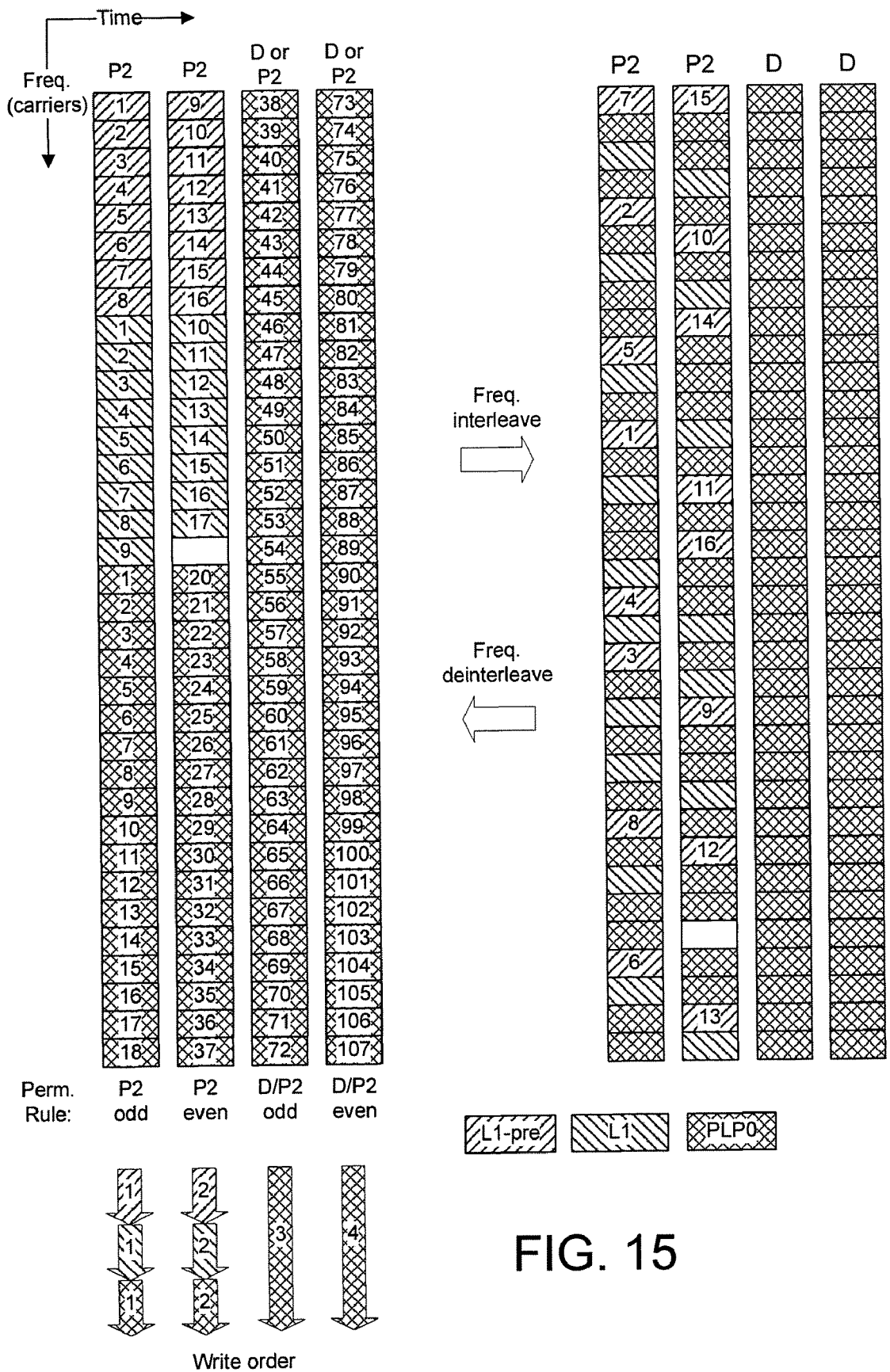
FIG. 15 shows an example of how PLP0 data may occupy P2 cells when P2 space is available in accordance with certain embodiments.

FIG. 15 shows an example of how PLP0 data may occupy P2 cells when P2 space is available in accordance with certain embodiments. In this regard, FIG. 15 is similar to FIG. 7. But the write order in FIG. 15 is "top down" for L1 pre-signalling and L1 signalling.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments.

In addition, the functionality may be embodied in whole or in part in firmware or hardware equivalents such as integrated circuits, field programmable gate arrays (FPGA), application specific integrated circuits (ASIC), and the like.

Embodiments include any novel feature or combination of features disclosed herein either explicitly or any generalization thereof. While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A method comprising:
   distributing, by a processor, physical layer pre-signalling data among preamble symbols;
   in response to determining that physical layer data is not larger than a predetermined number of preamble symbols such that there is excess preamble symbol space, placing data for link layer signaling in the excess preamble symbol space or leaving the excess preamble symbol space empty;
   using a first permutation rule to frequency interleave odd-numbered orthogonal frequency division multiplexing symbols;
   using a second permutation rule to frequency interleave even-numbered orthogonal frequency division multiplexing symbols, wherein the second permutation rule differs from the first permutation rule; and assigning physical layer pre-signalling cells in a row-wise zig-zag manner into the preamble symbols, wherein physical layer pipe data comprising the link layer signaling data is mapped into excess preamble cells in top-down order.

2. An apparatus comprising:

a processor; and a memory including computer executable instructions, the memory and the computer executable instructions configured to, with the processor, cause the apparatus at least to:

distribute physical layer pre-signalling data among preamble symbols;

in response to determining that physical layer data is not larger than a predetermined number of preamble symbols such that there is excess preamble symbol space, place data for link layer signaling in the excess preamble symbol space or leave the excess preamble symbol space empty;

use a first permutation rule to frequency interleave odd-numbered orthogonal frequency division multiplexing symbols;

use a second permutation rule to frequency interleave even-numbered orthogonal frequency division multiplexing symbols, wherein the second permutation rule differs from the first permutation rule; and assign physical layer pre-signalling cells in a row-wise zig-zag manner into the preamble symbols, wherein physical layer pipe data comprising the link layer signaling data is mapped into excess preamble cells in top-down order.

3. A method comprising:

receiving orthogonal frequency division multiplexing symbols;

demultiplexing the orthogonal frequency division multiplexing symbols to preamble symbols and physical layer pipe data symbols comprising link layer signaling;

frequency deinterleaving the preamble symbols;

frequency deinterleaving the physical layer pipe data symbols;

demultiplexing, by a processor, physical layer pre-signalling data and physical layer signalling data from the preamble symbols and, in response to determining that physical layer pipe data is present in the preamble symbols, demultiplexing the physical layer pipe data from the preamble symbols; and demultiplexing physical layer pipe data from the physical layer pipe data symbols and, in response to determining that link layer signalling data is present in the physical layer pipe data symbols, demultiplexing the link layer signalling data from the physical layer pipe data symbols.

4. The method of claim 3, further comprising: processing the physical layer pre-signalling data to extract physical layer modulation, code rate, and size.

5. The method of claim 4, wherein processing the physical layer pre-signalling data comprises using an across and then down zig zag write order while time deinterleaving physical layer pre-signalling cells.

6. The method of claim 3, further comprising: processing the physical layer signalling data to extract modulation, code rate, and size for one or more physical layer pipes.

7. An apparatus comprising:

a processor; and a memory including computer executable instructions, the memory and the computer executable instructions configured to, with the processor, cause the apparatus at least to:

receive orthogonal frequency division multiplexing symbols;

demultiplex the orthogonal frequency division multiplexing symbols to preamble symbols and physical layer pipe data symbols comprising link layer signaling;

frequency deinterleave the preamble symbols;

frequency deinterleave the physical layer pipe data symbols;

demultiplex physical layer pre-signalling data and physical layer signalling data from the preamble symbols and, in response to determining that physical layer pipe data is present in the preamble symbols, demultiplex the physical layer pipe data from the preamble symbols; and demultiplex physical layer pipe data from the physical layer pipe data symbols and, in response to determining that link layer signalling data is present in the physical layer pipe data symbols, demultiplex the link layer signalling data from the physical layer pipe data symbols.

8. The apparatus of claim 7, wherein the executable instructions, when executed by the processor, cause the apparatus to perform: processing the physical layer signalling data to extract modulation, code rate, and size for one or more physical layer pipes.

9. An apparatus comprising:

means for receiving orthogonal frequency division multiplexing symbols;

means for demultiplexing the orthogonal frequency division multiplexing symbols to preamble symbols and physical layer pipe data symbols comprising link layer signaling;

means for frequency deinterleaving the preamble symbols;

means for frequency deinterleaving the physical layer pipe data symbols;

means for demultiplexing physical layer pre-signalling data and physical layer signalling data from the preamble symbols and, in response to determining that physical layer pipe data is present in the preamble symbols, demultiplexing the physical layer pipe data from the preamble symbols; and means for demultiplexing physical layer pipe data from the physical layer pipe data symbols and, in response to determining that link layer signalling data is present in the physical layer pipe data symbols, demultiplexing the link layer signalling data from the physical layer pipe data symbols.

10. The apparatus of claim 9, further comprising: means for processing the physical layer pre-signalling data to extract physical layer modulation, code rate, and size.

11. The apparatus of claim 10, wherein the means for processing the physical layer pre-signalling data comprises means for using an across and then down zig zag write order while time deinterleaving physical layer pre-signalling cells.

12. The apparatus of claim 9, further comprising: means for processing the physical layer signalling data to extract modulation, code rate, and size for one or more physical layer pipes.

13. A memory device storing instructions that, when executed, cause an apparatus at least to:

distribute physical layer pre-signalling data among preamble symbols;

in response to determining that physical layer data is not larger than a predetermined number of preamble symbols such that there is excess preamble symbol space, place data for link layer signaling in the excess preamble symbol space or leave the excess preamble symbol space empty;

use a first permutation rule to frequency interleave odd-numbered orthogonal frequency division multiplexing symbols;

use a second permutation rule to frequency interleave even-numbered orthogonal frequency division multiplexing symbols, wherein the second permutation rule differs from the first permutation rule; and assign physical layer pre-signalling cells in a row-wise zig-zag manner into the preamble symbols, wherein physical layer pipe data comprising link layer signaling data is mapped into excess preamble cells in top-down order.

14. A memory device storing instructions that, when executed, cause an apparatus at least to:

receive orthogonal frequency division multiplexing symbols;

demultiplex the orthogonal frequency division multiplexing symbols to preamble symbols and physical layer pipe data symbols comprising link layer signaling;

frequency deinterleave the preamble symbols;

frequency deinterleave the physical layer pipe data symbols;

demultiplex physical layer pre-signalling data and physical layer signalling data from the preamble symbols and, in response to determining that physical layer pipe data is present in the preamble symbols, demultiplex the physical layer pipe data from the preamble symbols; and demultiplex physical layer pipe data from the physical layer pipe data symbols and, in response to determining that link layer signalling data is present in the physical layer pipe data symbols, demultiplex the link layer signalling data from the physical layer pipe data symbols.

15. The memory device of claim 14, wherein the instructions, when executed, cause the apparatus to process the physical layer pre-signalling data to extract physical layer modulation, code rate, and size.

16. The memory device of claim 15, wherein processing the physical layer pre-signalling data comprises using an across and then down zig zag write order while time deinterleaving physical layer pre-signalling cells.

17. The memory device of claim 14, wherein the instructions, when executed, cause the apparatus to processing the physical layer signalling data to extract modulation, code rate, and size for one or more physical layer pipes.

18. The method of claim 1, wherein in response to determining that the physical layer data is larger than the predetermined number of preamble symbols, writing excess physical layer data to data symbols immediately following the preamble symbols in top-down order symbol by symbol or increasing the predetermined number of preamble symbols to enable signaling data reception directly from the preamble symbols without performing channel estimation from the following data symbols.

19. The apparatus of claim 2, wherein in response to determining that the physical layer data is larger than the predetermined number of preamble symbols, writing excess physical layer data to data symbols immediately following the preamble symbols in top-down order symbol by symbol or increasing the predetermined number of preamble symbols to enable signaling data reception directly from the preamble symbols without performing channel estimation from the following data symbols.

20. The memory device of claim 12, wherein in response to determining that the physical layer data is larger than the predetermined number of preamble symbols, writing excess physical layer data to data symbols immediately following the preamble symbols in top-down order symbol by symbol or increasing the predetermined number of preamble symbols to enable signaling data reception directly from preamble symbols without performing channel estimation from the following data symbols.

21. The apparatus of claim 7, wherein the executable instructions, when executed by the processor, cause the apparatus to perform: processing the physical layer pre-signalling data to extract physical layer modulation, code rate, and size.

22. The apparatus of claim 21, wherein processing the physical layer pre-signalling data comprises using an across and then down zig zag write order while time deinterleaving physical layer pre-signalling cells.

* * * * *